June 28, 1932. A. J. ABEL 1,864,881
MEANS FOR AUTOMATICALLY CONTROLLING THE ACCELERATOR PEDAL OF A MOTOR VEHICLE
Filed Nov. 13, 1931
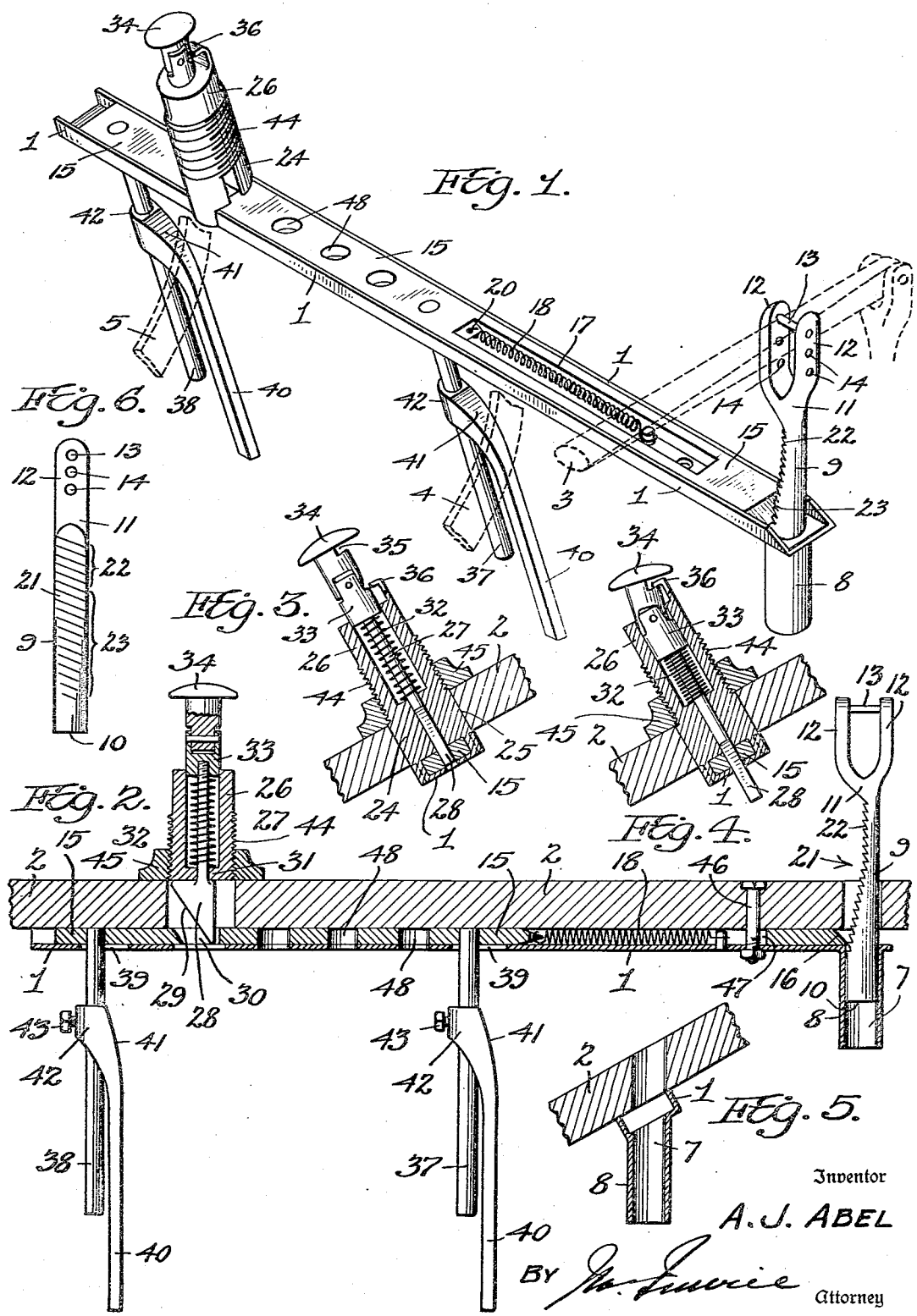
Inventor
A. J. ABEL
By
Attorney Patented June 28, 1932

1,864,881

UNITED STATES PATENT OFFICE

ALF J. ABEL, OF RICHMOND HILL, NEW YORK

MEANS FOR AUTOMATICALLY CONTROLLING THE ACCELERATOR PEDAL OF A MOTOR VEHICLE

Application filed November 13, 1931. Serial No. 574,899.

This invention is directed to means for automatically controlling the accelerator pedal of a motor vehicle, with a view to locking the pedal in any selected position of speed control, and selectively releasing it by direct manual control or through operation of the brake or clutch pedal.

The invention provides a means whereby the driver may set the accelerator pedal in the usual manner for selective speed of the vehicle, the controlling means of this invention automatically holding the pedal in set position without further attention on the part of the driver, entirely relieving the driver of any further effort in connection with the accelerator pedal in maintaining the desired speed; the controlling means, however, being responsive to direct operation, or to operation through brake or clutch pedal movement, for releasing the accelerator pedal for return to normal position, or to a selective speed position.

An essential feature of the present invention is the provision of means whereby the accelerator pedal control means, when holding such pedal at high-speed range, may in initial release permit the accelerator pedal to return to a lower predetermined running speed, with the control means thereafter readily controllable to release the accelerator for successive predetermined speed reductions, thereby permitting the driver, if the vehicle is running at high speed, to automatically reduce such speed to a desired running speed without again actuating the accelerator pedal, and further reduce the vehicle speed from such running speed in definite speed reductions without direct manual setting of the accelerator pedal; though it is of course to be understood that through proper actuation of the control means to release the accelerator pedal for complete return to normal or no-speed position at will.

The invention is illustrated in the accompanying drawing, in which:—

Fig. 1 is a perspective view of the control means for the accelerator pedal, such pedal as well as the brake and clutch pedals being shown in dotted lines.

Fig. 2 is a longitudinal sectional view, partly in elevation, of the same.

Fig. 3 is a sectional view, partly in elevation, of the manual actuator for the control means.

Fig. 4 is a similar view, showing the actuator in position to holding the control means inoperative with respect to the accelerator pedal.

Fig. 5 is a section of a detail.

Fig. 6 is a face view of the locking bar of the control means.

The improved mechanism comprises an elongated channel bar 1, designed to be secured beneath the floor board 2 of the vehicle in a manner to be described, the operative end of the channel bar underlying the accelerator pedal 3, the bar extending to and beyond the positions coincident with the planes of movement of the brake pedal 4 and clutch pedal 5.

That end of the channel bar underlying the accelerator pedal is formed with an opening 7, leading to a depending guide sleeve 8. The latter is preferably at an angle to the plane of the channel bar, in order that the bar when fitted beneath the inclined floor board, may present the guide sleeve in a vertical plane.

The control mechanism includes a locking bar 9, formed at the lower end, as at 10, to slidably fit the sleeve 8, and at the upper end with a yoke 11, between the arms 12 of which the accelerator pedal 3 is extended. A pin 13, preferably in the form of a cotter pin, is arranged to cooperate with either pair of a series of holes 14 formed in the yoke arms 12, to thereby determine the degree of freedom of movement of accelerator pedal without affecting the control means. As the pin 13 limits the upward movement of the accelerator pedal under its usual spring, and as the pedal when moved downwardly will operate the locking bar when the pedal engages the bottom of the yoke, it follows that with the pin 13 in the upper most pair of holes 14, such pedal may be moved for limited speed control without affecting the control mechanism, as may at times be desirable. This freedom may obviously be controlled by the position of the pin 13, the lowermost position being designed to prevent any freedom of movement of such accelerator pedal.

A locking bolt in the form of a bar-like member 15 is mounted for sliding movement in the channel bar 1, the operative end of the bolt next the opening 7 being inclined to present an engaging edge 16 guided on the bed of the channel bar 1. The bolt 15 is formed with an elongated slot 17, to receive a spring 18, one end being secured to the channel bar at 19 and the opposite end to the bolt at one end of the slot, as at 20. The spring normally urges the locking bolt to a position to move the nose end 16 over the opening 7, which is the operative position of the bolt.

The locking bar 9, intermediate the end 10 and the yoke 11, is formed on the side next the nose of the locking bolt with a series of ridges or teeth 21, which as the locking bolt is inclined to the plane of the locking bar are inclined to permit the nose of the locking bolt to directly and accurately cooperate with such teeth. The arrangement of the teeth 21 of the bar 9 are provided for the automatic speed reduction under the control mechanism, and for this purpose are arranged in an upper series 22, in which the teeth are in a direct vertical plane, and in a lower series 23 in which the teeth are successively in offset planes inwardly toward the nose of the locking bolt. Thus the upper series of teeth are directly superimposed in a single vertical plane, while the uppermost tooth of the lower series is inwardly offset with respect to the teeth of the upper series, and each successive tooth of such lower series is inwardly offset with respect to the preceding tooth.

As the accelerator pedal is depressed beyond its range of freedom, if such is permitted, the locking bar 9 is correspondingly moved downwardly, and if the locking bolt is free to move the nose 16 thereof engages the particular tooth in line with such nose and holds the accelerator pedal locked in such position. Of course, as the locking bolt is normally free to move, the movement of the accelerator pedal to desired speed position will result in an automatic locking of the pedal in that position, relieving the driver of further effort or attention to such pedal so long as the attained speed is desired.

To provide for manually releasing the locking bar 9 and thereby the accelerator pedal, the channel bar 1 is provided near the end remote from the accelerator pedal, or at other desired point, with a vertical extension 24, arranged to pass through an opening 25 in the floor board 2, and projecting thereabove in the form of a sleeve 26. Slidable in the sleeve 26 is a rod 27, formed at the lower end as an inclined latch nose 28, the inclined surface 29 of which is arranged to cooperate with the edge of an opening 30 in the locking bolt, and on continued depression of the rod 27, serve to move the bolt longitudinally of the channel bar 1 to free the locking bar 9. The sleeve is formed with a transverse partition 31, forming an upper limit of movement for the latch nose 28, and serving to provide a base for a spring 32, encircling the rod 27 above the partition, and bearing at the upper end beneath an enlarged head 33 on the rod 27.

The head 33 is provided with a pivoted foot-button 34, the web of which has a notch 35, which when the button is tilted may be engaged with a locking lip 36 carried by the upper end of the sleeve 26.

Obviously, at will, depression on the button 34 will cause the latch nose 28 to move the locking bolt to release the locking bar 9, and thereby release the accelerator pedal. This release function has however a limited or a full effect on the locking bar, as will be evident. For example, with the vehicle traveling at high speed, when the locking bar will be engaged by the nose of the locking bolt within the range of the upper series of teeth 22, a sufficient depression of the latch nose 28 to move the locking bolt to just free this upper series of teeth, will permit the rocking bar 9 to move upwardly until the upper tooth of the lower series of teeth 23 is reached. As the nose of the locking bar has not moved sufficiently far to escape this particular tooth, the latter will engage the nose of the locking bolt, and the locking bar, and thereby the accelerator pedal will be again locked. If this particular tooth corresponds to a road running speed, which may obviously be selective, the mere release of the locking bolt to a limited extent will cause the high speed of the vehicle to be reduced to a selected running speed without any direct accelerator pedal operation of the driver. As the teeth 23 of the lower series each project farther toward the nose of the locking bolt in downward order, a slight movement of the locking bolt, when engaged in any one such tooth will effect automatic cooperation with the next lower tooth of the series. If these teeth are so formed, relative to accelerator control that each represents a definite speed reduction, say five miles per hour, the speed of the vehicle may after reaching running speed, be progressively and accurately reduced as desired without the necessity of actuating the accelerator pedal.

With the accelerator speed control locked at a predetermined speed, it may become necessary to fully release such speed control in an emergency requiring use of both the clutch and brake pedals, or either. To provide for releasing the locking bar 9, through proper movement of the locking bolt, when either the clutch or brake pedal is operated, the locking bolt is provided with depending rods 37 and 38, which extend through slots 39 in the channel bar 1, and depend alongside of the brake and clutch pedals respectively. Slidably adjustable on each rod is a cam element in the form of a sleeve engaging the rod and an arm depending from the sleeve. The arm 40 is outwardly and downwardly inclined at the upper portion, as at 41, and then depends parallel to the rod, while the sleeve 42 is turnable and slidable on the rod, and held in fixed position by a set screw 43. Either cam arm may be turned to a position to be engaged on the depression of the cooperating vehicle pedal, and such pedal, when acting against the cam will move the rod and thereby the locking bolt to free the locking bar, and thereby the accelerator pedal, for the return of the latter to normal or no-speed position. Either or both cam rods may be positioned for cooperation with the particular vehicle pedal, or both may be turned to inoperative position, when desired.

It has been stated that the manual actuator, that is the latch nose 28 may be locked in fully operative position by the lip 36 and notch 35. In this position the locking bolt is held in withdrawn position, and the accelerator pedal may be operated solely by the foot of the operator in the usual manner, entirely free of the control mechanism. When desiring to resume automatic control of the pedal, the foot button 34 is pressed laterally, to free the lip 36 and notch 35, and normal locking function of the locking bolt is automatically inaugurated on operation of the accelerator pedal.

The channel bar and supported locking bolt is secured to the floor board by the extension 24, which is exteriorly threaded at 44 to receive a nut 45 for bearing on the upper side of the floor board 2; and further secured at the opposite end by a bolt 46 passed through the channel member and floor board, the locking bolt being channeled at 47 for movement regardless of bolt 46. Both the channel bar 1 and locking bolt 15 are formed with a series of openings 48, in register when the parts are in normal positions, to permit free escape of dirt which may accumulate between the floor board and channel bar in the use of the device.

The invention provides a mechanism which may be selectively placed in control of the accelerator when desired, and which when in operation provides for locking the pedal at any speed range; the mechanism also providing for automatic speed reduction to predetermined ranges without the necessity of actuating the pedal directly.

It will be noted that, as described, a predetermined operation of the manual release means causes the locking bar to move throughout the range of the upper set of teeth, for when the locking bolt is moved to release a particular engaged tooth, it is, of course, free of all teeth of the upper range because they are in vertical alignment. Therefore, a proper and limited operation of the manual release means will cause the locking bar to move to the upper tooth of the lower range which is offset from the vertical.

Thus, by the manual release means in predetermined limited operation, the accelerator reduces the speed of the vehicle from that maximum speed included at any point in the upper range of teeth to the predetermined speed determined by the upper tooth of the lower range. This particular function is incident to the camming means 41 of the arms 40 which are engaged by the respective clutch and brake pedals, that is, this camming means corresponds exactly to the incline of the nose 28 of the manual release means. Thus, if either clutch or brake pedal is operated throughout the predetermined range of the cam sections 41, the locking bolt is moved to a position to release the locking bar for movement throughout the full length of the upper range of teeth, the locking bar being, of course, automatically interrupted by the cooperation of the locking bolt and the uppermost tooth of the lower range of teeth. On continued movements of either clutch or brake pedal to a slight extent, the speed of the vehicle may be successively reduced in accordance with the range of speed determined by successive teeth of the locking bar and this operation is, of course, incident to the operation of the manual release means, as previously described.

In other words, the cams to permit operation of the locking bolt by either clutch or brake pedal and the element of the manual release means which operates the locking bolt have camming surfaces of substantially similar influence on the locking bolt, so that by appropriate movement of either, the speed of the vehicle may be automatically reduced to a predetermined extent and thereafter successively reduced for periods of speed reduction corresponding to the movement permitted the accelerator in the action of the locking bar a distance between any two teeth of the lower range of teeth.

The relative freedom of movement of the accelerator pedal relative to the locking bar incident to the mounting of the accelerator pedal in the yoke 11 is another desirable function. Ordinarily, when accelerating the speed of the automobile, the accelerator pedal is moved initially to a position to rapidly increase the speed of the motor, and usually this position of the accelerator pedal, if maintained, would cause the car to travel at a higher speed than that desired, so that when reaching this speed the accelerator pedal is generally allowed to return toward inoperative position until the speed of the car is substantially constant at the desired rate of travel.

Under this type of operation, which is the usual one, the accelerator pedal of this invention, when depressed to move the locking bar, will carry the bar to a locked position which is less than that indicated by the motor to the then depressed position of the accelerator pedal. In other words, the accelerator pedal being at the bottom of the yoke will carry the locking bar to an engine control position somewhat less than that indicated by the then position of the accelerator pedal. As the car reaches the desired speed, the pressure on the accelerator pedal is released, and incident to the freedom of movement, the accelerator pedal will return from normal position to that position which holds the motor at an operating speed for moving the car at the desired speed. Thus, the car may be quickly accelerated and on release of the pedal the latter returns to a position for speed control which is indicated by the set of the locking bar. Thus, the freedom of play of the accelerator pedal permits the car to be rapidly brought to the desired speed by a movement of the pedal beyond that necessary to attain that speed, the release of the pedal setting all parts in normal position for that speed.

Having thus described the invention, what is claimed as new is:—

1. An accelerator pedal control means for motor vehicles, including a locking bar to be operated in the movement of the pedal, a locking bolt movable relative to the bar, and means on the bar to be engaged by the bolt, said means being in independent series to provide for a predetermined release movement of the bar under appropriate bolt movement equal to the length of one series and the automatic interruption of bar release at the beginning of the other series.

2. An accelerator pedal control means for motor vehicles, including a locking bar to be operated in the movement of the pedal, a locking bolt movable relative to the bar, and two independent series of teeth on the bar with which the bolt cooperates to hold the bar in set position, one series being in vertical alinement relative to the bar and the other series being successively inwardly offset relative to the first series and to the locking bolt.

3. An accelerator pedal control means for motor vehicles, including a locking bar formed with teeth, a locking bolt movable to engage and disengage with such teeth, said locking bar being engaged and operated in the speed-increasing movement of the accelerator pedal, the upper end of the bar being formed as a yoke open at the upper end to receive the accelerator pedal, and a pin selectively closing the upper end of the yoke above the accelerator pedal at any one of a plurality of points longitudinally of the yoke, whereby the accelerator pedal is permitted a selective degree of freedom within the yoke without affecting the locking bar.

4. An accelerator pedal control means for motor vehicles, including a locking bar formed with a yoke to receive the accelerator pedal, said bar being formed with teeth, a locking bolt operative to engage and disengage said teeth, and a pin adjustable relative to said yoke to limit upward movement of the pedal, the relation of the pin and bottom of the yoke determining the freedom of the pedal for speed control movement without affecting the bar.

5. An accelerator pedal control means for motor vehicles, including a locking bar to be actuated by the accelerator pedal, a locking bolt to engage and hold the bar in pedal actuated position, rods depending from the bolt adjacent the clutch and brake pedals of the vehicle, and cam elements on the rods to cause the movements of the clutch or brake pedals to move the locking bolt to free the locking bar.

6. An accelerator pedal control means for motor vehicles including a locking bar to be operated in the movement of the pedal, a locking bolt movable relative to the bar, means on the bar to be engaged by the bolt for holding the bar and thereby the accelerator pedal in a predetermined position of operation, said means including two series of teeth, the teeth of one series being in alignment vertically of the bar and the teeth of the other series being inclined with respect to the vertical axis of the bar, the inclined series of teeth being in the operative plane of the locking bolt when the latter is in certain positions free of the vertical series of teeth.

7. An accelerator pedal control means for motor vehicles including a locking bar, means for connecting the bar and accelerator pedal to cause the bar to respond to operative movements of the pedal and to determine operative position of the pedal, a locking bolt for cooperation with the bar to determine the operative position of the latter, said locking bar being formed with an upper series of teeth in predetermined number and arranged parallel to the vertical axis of the bar and with a lower series of teeth forming a continuation of the upper series and inclined with respect to the vertical axis of the bar and in a direction toward the locking bolt, the locking bolt cooperating with the teeth of the locking bar in accordance with the movement of that bar under the operative action of the accelerator pedal, and means for operating the locking bolt to free it from cooperation with the teeth of the locking bar.

8. An accelerator pedal control means for motor vehicles including a locking bar, means for connecting the bar and accelerator pedal to cause the bar to respond to operative movements of the pedal and to determine operative position of the pedal, a locking bolt for cooperation with the bar to determine the operative position of the latter, said locking bar being formed with an upper series of teeth in predetermined number and arranged parallel to the vertical axis of the bar and with a lower series of teeth forming a continuation of the upper series and inclined with respect to the vertical axis of the bar and in a direction toward the locking bolt, the locking bolt cooperating with the teeth of the locking bar in accordance with the movement of that bar under the operative action of the accelerator pedal, and means for operating the locking bolt to free it from cooperation with the teeth of the locking bar, a certain degree of movement of the locking bolt to free the bolt with respect to the upper series of teeth of the locking bar positioning said bolt for limiting the freedom of movement of the locking bar to a position in which the locking bolt engages with one of the inclined series of teeth of the locking bar.

9. An accelerator pedal control means including a locking bar operated in one direction by the accelerator pedal and serving as an accelerator pedal holding means, said locking bar being formed with teeth extending throughout the locking range of movement of the bar, said teeth including an upper series aligned vertically of the bar and a lower series inclined outwardly and downwardly with respect to the bar, a locking bolt having an operative position to engage the teeth of the bar, and means for moving the bolt toward an inoperative position, said means when moving the bolt to free any one of the upper series of teeth serving to permit responsive movement of the bar throughout the full length of the upper series of teeth, a certain degree of movement of the bolt positioning said bolt to be engaged by one of the lower series of teeth to automatically prevent further release movement of the bar.

10. An accelerator pedal control means including a locking bar operated in one direction by the accelerator pedal and serving as an accelerator pedal holding means, said locking bar being formed with teeth extending throughout the locking range of movement of the bar, said teeth including an upper series aligned vertically of the bar and a lower series inclined outwardly and downwardly with respect to the bar, a locking bolt having an operative position to engage the teeth of the bar, and means for moving the bolt toward an inoperative position, said means when moving the bolt to free any one of the upper series of teeth serving to permit responsive movement of the bar throughout the full length of the upper series of teeth, a certain degree of movement of the bolt positioning said bolt to be engaged by one of the lower series of teeth to automatically prevent further release movement of the bar, the means for moving the locking bolt providing for locking bolt movement for successive release of the locking bar in a step by step movement throughout the inclined series of teeth.

11. An accelerator pedal control means for motor vehicles including a locking bar connected to the accelerator pedal and movable operatively in one direction in any speed increasing movement of the accelerator pedal and movable inoperatively in the opposite direction by the accelerator pedal in a speed decreasing movement, a locking bolt to cooperate with said bar for holding the bar in any operative position corresponding to accelerator pedal movement and cooperating means between the bolt and bar to permit the bar on initial release movement of the bolt to move throughout a predetermined accelerator pedal release movement, said means serving to permit on successive release movements of the bolt the locking bar to move in a step by step accelerator pedal release movement, with such step by step movements materially less in distance than the initial permissible movement.

12. An accelerator pedal control means for motor vehicles including a locking bar responsive to accelerator pedal movement and serving to hold the accelerator pedal in predetermined position, a locking bolt cooperating with the bar to hold the bar in operative position as determined by accelerator pedal movement, a rod depending from the locking bolt adjacent the clutch pedal, and a cam element carried by the rod and operated in the movement of the clutch pedal to disengage the locking bolt from the locking bar.

13. An accelerator pedal control means for motor vehicles including a locking bar responsive to accelerator pedal movement and serving to hold the accelerator pedal in predetermined position, a locking bolt cooperating with the bar to hold the bar in operative position as determined by accelerator pedal movement, a rod depending from the locking bolt adjacent the clutch pedal, and a cam element adjustably carried by the rod and operated in the movement of the clutch pedal to disengage the locking bolt from the locking bar.

14. An accelerator pedal control means for motor vehicles including a locking bar movable in the operation of the accelerator pedal, said bar being formed with a series of teeth inclined with respect to the plane of movement of the bar, a locking bolt for cooperation with the teeth and operating in a plane normal to that of the bar movement, the inclined series of teeth providing for step by step release of the locking bar in the movement of the locking bolt, and means for selectively operating the locking bolt.

In testimony whereof, I affix my signature.

ALF J. ABEL.